US006883124B2

(12) United States Patent
Wiczer

(10) Patent No.: US 6,883,124 B2
(45) Date of Patent: Apr. 19, 2005

(54) ADAPTABLE TRANSDUCER INTERFACE

(75) Inventor: James J. Wiczer, Buffalo Grove, IL (US)

(73) Assignee: Sensor Synergy, Inc., Buffalo Grove, IL (US)

( * ) Notice: Subject to any disclaimer, the term of this patent is extended or adjusted under 35 U.S.C. 154(b) by 822 days.

(21) Appl. No.: 09/829,128

(22) Filed: Apr. 9, 2001

(65) Prior Publication Data

US 2002/0147936 A1 Oct. 10, 2002

(51) Int. Cl.[7] .................................................. G06F 11/00

(52) U.S. Cl. ........................... 714/57; 700/108; 700/90; 700/97

(58) Field of Search ....................... 714/57, 46; 700/80, 700/97, 108

(56) References Cited

U.S. PATENT DOCUMENTS

| | | | | |
|---|---|---|---|---|
| 5,068,850 | A | | 11/1991 | Moore |
| 5,335,186 | A | | 8/1994 | Tarrant |
| 5,375,073 | A | | 12/1994 | McBean |
| 5,627,998 | A | | 5/1997 | Mondrik et al. |
| 5,640,572 | A | | 6/1997 | Mondrik et al. |
| 5,650,800 | A | | 7/1997 | Benson |
| 5,710,727 | A | | 1/1998 | Mitchell et al. |
| 5,717,614 | A | | 2/1998 | Shah et al. |
| 5,724,272 | A | | 3/1998 | Mitchell et al. |
| 5,748,881 | A | | 5/1998 | Lewis |
| 5,764,546 | A | | 6/1998 | Bryant et al. |
| 5,772,963 | A | | 6/1998 | Cantatore et al. |
| 5,847,955 | A | | 12/1998 | Mitchell et al. |
| 5,854,904 | A | | 12/1998 | Brown |
| 5,875,415 | A | | 2/1999 | Lieb et al. |
| 5,918,194 | A | | 6/1999 | Banaska et al. |
| 5,953,681 | A | | 9/1999 | Cantatore et al. |
| 5,963,726 | A | | 10/1999 | Rust et al. |
| 5,974,541 | A | | 10/1999 | Hall et al. |
| 6,050,940 | A | | 4/2000 | Braun et al. |
| 6,085,156 | A | | 7/2000 | Rust et al. |
| 6,105,016 | A | | 8/2000 | Martin |
| 6,272,447 | B1 | * | 8/2001 | Gavin et al. .................. 703/1 |
| 2002/0095231 | A1 | * | 7/2002 | Yu et al. ....................... 700/97 |

* cited by examiner

*Primary Examiner*—Bryce P. Bonzo
(74) *Attorney, Agent, or Firm*—Wood, Phillips, Katz, Clark & Mortimer

(57) ABSTRACT

A method of interfacing a transducer element to a communication network is disclosed. The method comprises providing an adaptable transducer interface comprising a programmable transducer interface controller for connecting to the transducer element and a programmable network interface controller for connecting to the communication network. The transducer interface controller is operatively connected to the network interface controller. User selectable transducer information is received identifying operating characteristics of the transducer. User selectable operator interface information is received identifying display parameters interactively arranged for displaying operating data of the transducer. A transducer interface program is generated for converting transducer operating characteristics to user data and the transducer interface program is stored in the transducer interface controller. A network interface program is generated based on the display parameters for creating screen displays using the user data. The network interface program is stored in the network interface controller. The adaptable transducer interface is usable to remotely interface with the transducer element over the communication network.

22 Claims, 9 Drawing Sheets

Change TC#84 Display | Change TC#85 Display | Change Rel. Humidity Display | Change Update Interval

168

Board Dryer Temperature Profile

166

| TIME | TC#84 - TEMP. AT ENTRY | TC#85 - TEMP. IN MID-TUNNEL | AMBIENT REL HUMIDITY |
|---|---|---|---|
| 14:50 | 52 C | 82 C | 45% |
| 14:55 | 51 C | 81 C | 44% |
| 15:00 | 48 C | 81 C | 42% |
| 15:05 | 46 C | 82 C | 41% |
| 15:10 | 43 C | 83 C | 42% |
| 15:15 | 44 C | 84 C | 43% |
| 15:20 | 44 C | 85 C | 44% |
| 15:25 | 45 C | 85 C | 45% |
| 15:30 | 46C | 84 C | 46% |
| 15:35 | 47 C | 84 C | 47% |
| 15:40 | 48C | 83 C | 48% |
| 15:45 | 49 C | 82 C | 49% |
| 15:50 | 49 C | 83 C | 49% |
| 15:55 | 50 C | 82 C | 48% |

CLICK BUTTON TO ACTIVATE AUXILLIARY HUMIDITY EXHAUST FAN

170

FIG. 8

ADAPTABLE TRANSDUCER INTERFACE

BACKGROUND OF THE INVENTION

This invention relates to a method and apparatus for adaptably interfacing a transducer to a communication network.

Industrial control systems and process control systems, and the like, include various transducers elements such as sensors and actuators. The transducer elements may be connected to local control equipment proximate the transducer element for providing an operator interface. Alternatively, such control equipment may be located within the same plant, but not immediately proximate the transducer element. Under either scenario, individual wiring is provided to connect the transducer element to the control equipment.

There exists a desire for better, real time information of industrial processes such as for preventive maintenance in manufacturing facilities. Advantageously, the information is available remotely to a user, such as over a communication network. One example of how such connections can be made is the smart transducer functional specification specified in IEEE Standard 1451.2/1997. This standard provides a skeletal framework of how to interface sensors and transducers to networks using microprocessors. The specification defines a smart transducer interface module to be integrated into the transducer element during its manufacture.

SUMMARY OF THE INVENTION

In accordance with the invention, there is provided an adaptable transducer interface.

Broadly, in accordance with one aspect of the invention, there is disclosed the method of interfacing a transducer element to a communication network. The method comprises providing an adaptable transducer interface comprising a programmable transducer interface controller for connecting to the transducer element and a programmable network interface controller for connecting to the communication network. The transducer interface controller is operatively connected to the network interface controller. User selectable transducer information is received identifying operating characteristics of the transducer. User selectable operator interface information is received identifying display parameters interactively arranged for displaying operating data of the transducer. A transducer interface program is generated for converting transducer operating characteristics to user data and the transducer interface program is stored in the transducer interface controller. A network interface program is generated based on the display parameters for creating screen displays using the user data. The network interface program is stored in the network interface controller. The adaptable transducer interface is usable to remotely interface with the transducer element over the communication network.

In accordance with another aspect of the invention, there is disclosed a user adaptable transducer interface for interfacing a transducer element having a signal interface connection to a communication network. The transducer interface comprises a programmable transducer interface controller having terminations for connecting to the signal interface connection of the transducer element. A programmable network interface controller is provided for connecting to the communication network. The network interface controller is operatively connected to the transducer interface controller. A user configured transducer interface program is stored in the transducer interface controller for converting user selected transducer operating characteristics to user data. A user configured network interface program is stored in the network interface controller for creating screen displays based on user select display parameters using the user data. The programmable network interface controller is connectable to the communication network to provide a remote interface with the transducer over the communication network.

Further features and advantages of the invention will be readily apparent from the specification and from the drawings.

BRIEF DESCRIPTION OF THE DRAWINGS

FIGS. 7–9 illustrate screen displays generated by the network capable application processor of FIG. 2 to remotely interface with the transducer interface over the communication network of FIG. 1.

DETAILED DESCRIPTION OF THE INVENTION

In accordance with the invention, an adaptable, smart transducer interface (ASTI) unit provides hardware and software capabilities to enable remote monitoring of sensors and remote control of actuators. The invention as described herein includes a method to customize the ASTI unit to provide better sensor and actuator compatibility with lower costs to the end users.

Particularly, the ASTI unit consists of software and hardware components configured to connect several types of sensors and actuators to the user's local area Ethernet network using TCP/IP connection protocols. The ASTI unit transfers transducer information across Ethernet-compliant networks to network-enabled client personal computers. The client personal computer user views and controls ASTI unit connected sensors and actuators using the computer's browser software. The browser software is a graphical user interface program that resides in the computer and is designed to display HTML-formatted content files.

The ASTI units include an embedded microweb server to deliver small JAVA applet programs and HTML formatted information by way of the network, which may comprise the Internet, to the client computer browser's software. The JAVA applets and HTML content displays updated sensor and actuator data. The update rate can be predetermined by the user. The content update is accomplished using embedded JAVA applets to read sensors and write to actuators and then transfer this information to the client's web browser. If the user's network is connected to an Internet gateway, then the data can be made available to any authorized Internet user.

The ASTI unit may connect a broad array of transducer element to networks. The ASTI unit may be used with multiple transducers simultaneously and may also work with multiple types of sensors and actuators. The ASTI unit can be reconfigured as needs change. In particular, sensor calibration coefficients can be remotely updated, as sensor recalibration becomes necessary.

Figure 1:
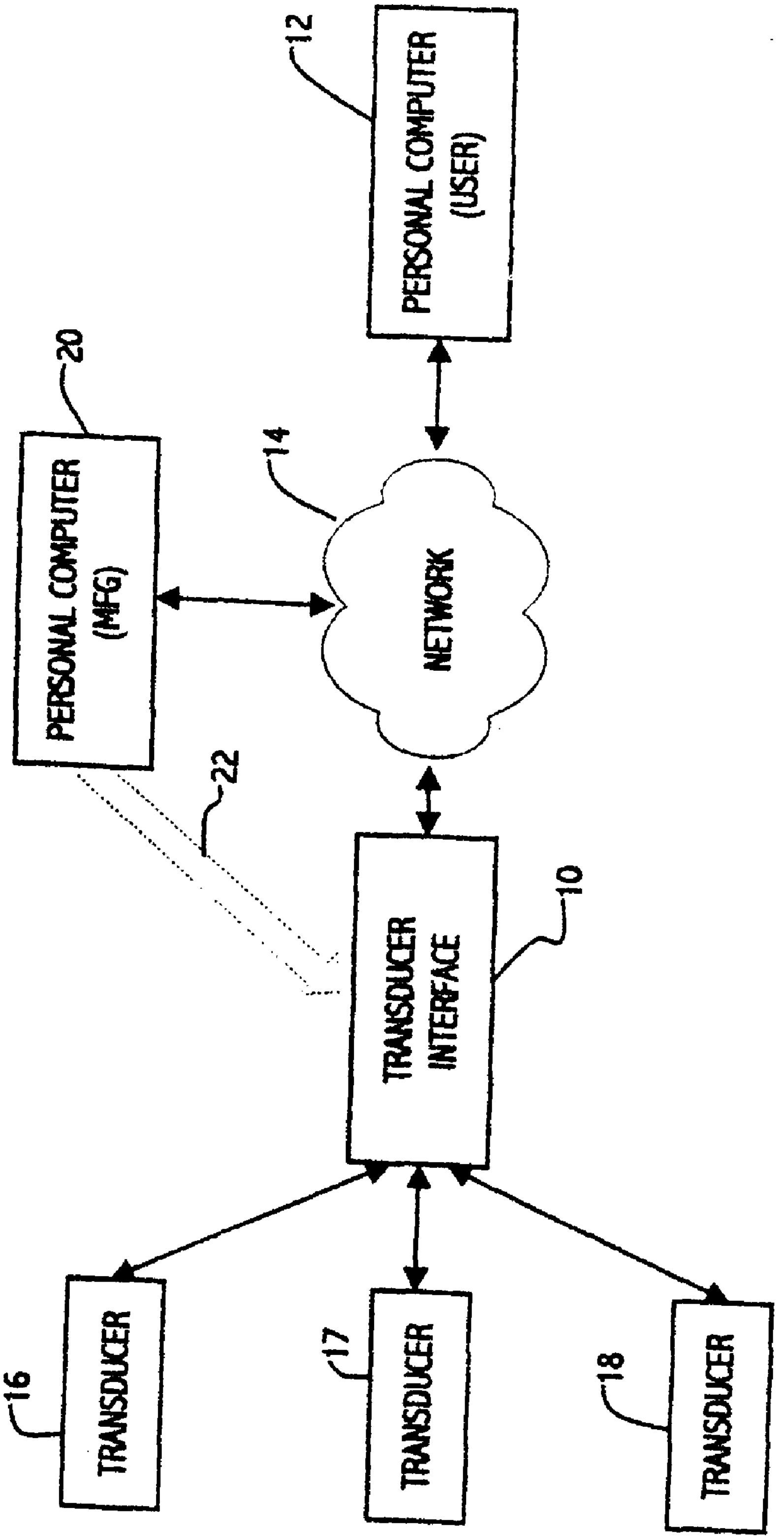
FIG. 1 is a generalized block diagram of an adaptable transducer interface in accordance with the invention being used to remotely interface with a transducer element over a communication network.

Referring to FIG. 1, a generalized block diagram illustrates an ASTI unit, referred to herein for simplicity as an adaptable transducer interface 10, in accordance with the invention. The ASTI unit 10 is used to enable a user's personal computer 12 to interface over a communication network 14 with three transducer elements 16, 17 and 18 but is not limited to three transducer elements. The transducer elements 16–18 may be in the form of sensors, actuators or a combination of sensors and actuators. For example, process instrumentation sensors providing a 4–20 milliAmp current signal or a 0–5 volt voltage signal may be used, or thermocouples or RTD units, or the like. Likewise, the transducer elements may consist of actuator devices, such as control valves, heating elements, etc. The adaptable transducer interface 10 is not intended to be limited to any specific type of transducer element.

The present invention is particularly directed to a method of adaptably configuring a transducer interface 10 for a particular set of transducer elements, such as the transducer elements 16–18. This configuration may be implemented based on user selection made at the user's personal computer 12 during the ordering process. The configuration information is then generated and stored in the transducer interface 10 using a manufacturing personal computer 20 also connected to the network 14.

In accordance with the invention, the network 14 can be virtually any type of communication network. Example of such a communication network 14 are an Ethernet local area network (LAN), an Ethernet wide-area network (WAN) or the Internet. As described below, the user personal computer 12 is used in an ordering process for communicating with the manufacturing personal computer 20. During the ordering process the user selects transducer information identifying operating characteristics of a transducer element and provides user selectable operator interface information identifying display parameters interactively arranged for displaying operating data of a transducer element. The manufacturing personal computer 20 then compiles the user selectable information and generates a transducer interface program for converting transducer operating characteristics to user data and stores the transducer interface program in the transducer interface. The manufacturing personal computer 20 also generates a network interface program based on the display parameters for creating screen displays using the user data and stores the network interface program in the network interface controller. The transducer interface program and network interface program are downloaded to the transducer interface 10 over a communication link 22 during manufacturing of the transducer interface 10. As is apparent, the transducer interface 10 would not be connected to the communication network 14 or the transducer elements 16–18 during the manufacturing process.

Figure 2:
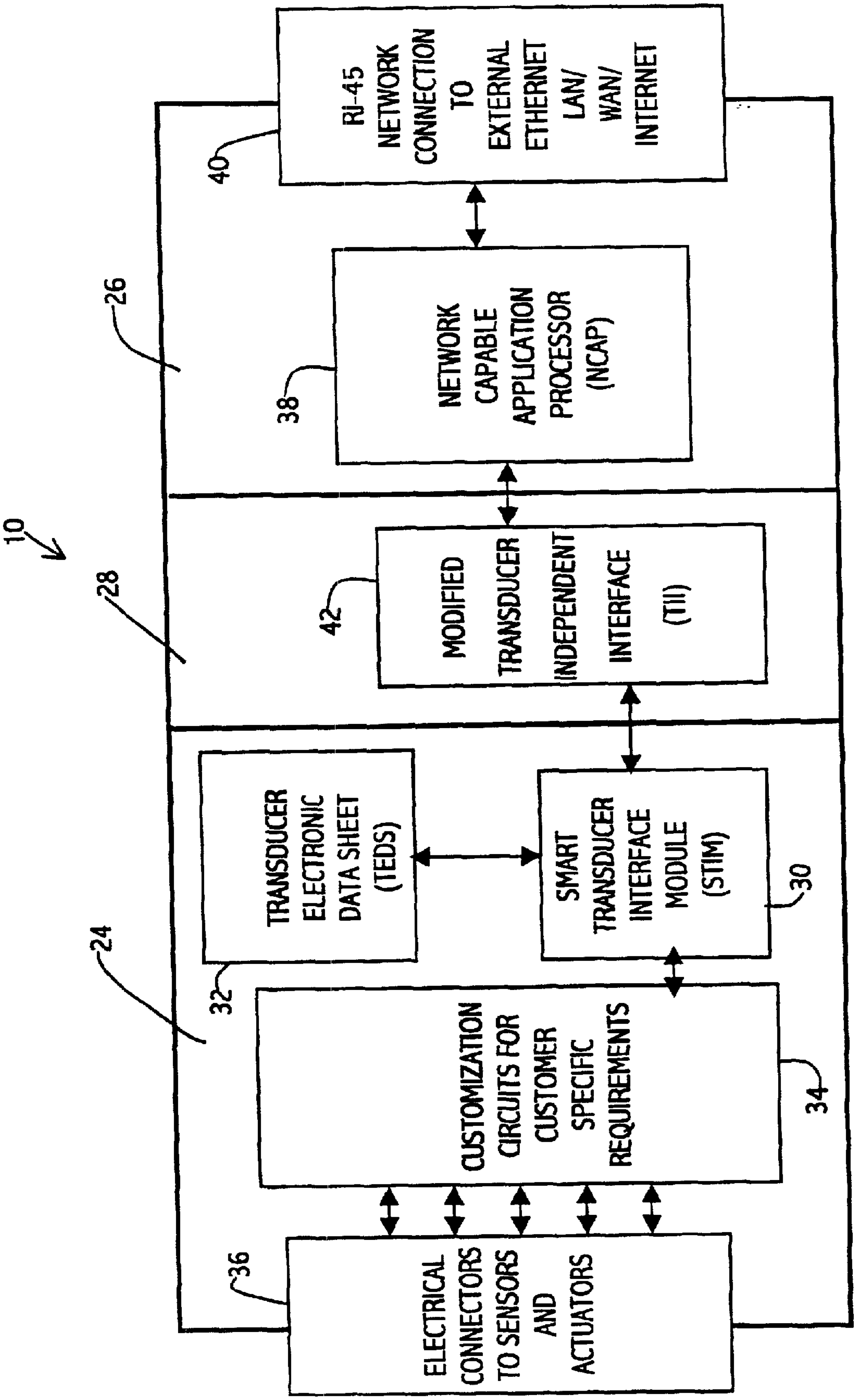
FIG. 2 is a block diagram of the adaptable transducer interface of FIG. 1.

Referring to FIG. 2, a block diagram of the transducer interface 10 is illustrated. The transducer interface 10 includes a transducer board 24, a network board 26 and an interface board 28 connecting the transducer board 24 to the network board 26.

The transducer board 24 includes a smart transducer interface module (STIM) 30 connected to a transducer electronic data sheet (TEDS) 32 and customization circuits for customer-specific requirements 34. The customization circuits 34 are in turn connected to electrical connectors 36. The electrical connectors 36 are provided for connecting to a signaling interface of transducer elements according to the particular type of transducer element.

The network board 26 includes a network-capable application processor (NCAP) 38 connected to an RJ-45 network connector 40 for providing connection to an external Ethernet LAN/WAN/Internet. The interface board 28 includes a modified transducer-independent interface (TII) 42 for connecting the NCAP 38 to the STIM 30.

The STIM 30 comprises a transducer interface microcontroller containing software to interpret commands from the NCAP 38. The STIM 30 may be a microconverter chip with a core microprocessor. The STIM 30 is loaded with different software modules based on user-selectable transducer information identifying operating characteristics of the particular transducer element as requested by the user.

The TEDS 32 is stored in nonvolatile memory in the STIM microcontroller. The TEDS contains specific information about the attached transducer elements. This information can be changed in the field and includes calibration information to transform measured electrical parameters into desired physical quantities.

The customization circuits 34 are socketed integrated circuits or daughter boards that are included with the transducer interface 10 based on customer requirements. Appropriate circuits are selected and installed at the time of manufacture. Control and information signals are directed to and/or from circuits with jumper plugs as needed. For example, a customer requesting a 4–20 milliAmp interface will require a particular interface circuit while a customer using a Type "K" thermocouple will require a different type of interface. After the ASTI manufacturing process has been completed, the software resident in the STIM 30 is compatible with the particular hardware interface elements.

The NCAP 38 comprises a programmable network interface controller. The NCAP 38 includes TCP/IP stack and a local processor to serve JAVA applets and HTML formatted files using HTTP protocol. These files are capable of displaying transducer status information pages using a web browser program running on the local processor. One example is an embedded microweb server, such as a CoBOX Micro manufactured by Lantronix. The NCAP 38 includes sufficient memory for storage of HTML pages, images and JAVA applets.

Tasks performed by the TII 42 are performed primarily using RS-23C serial interface with the NCAP 38 with RTS/CTS hardware handshaking. Trigger functions are performed by software, as described below.

Figure 3:
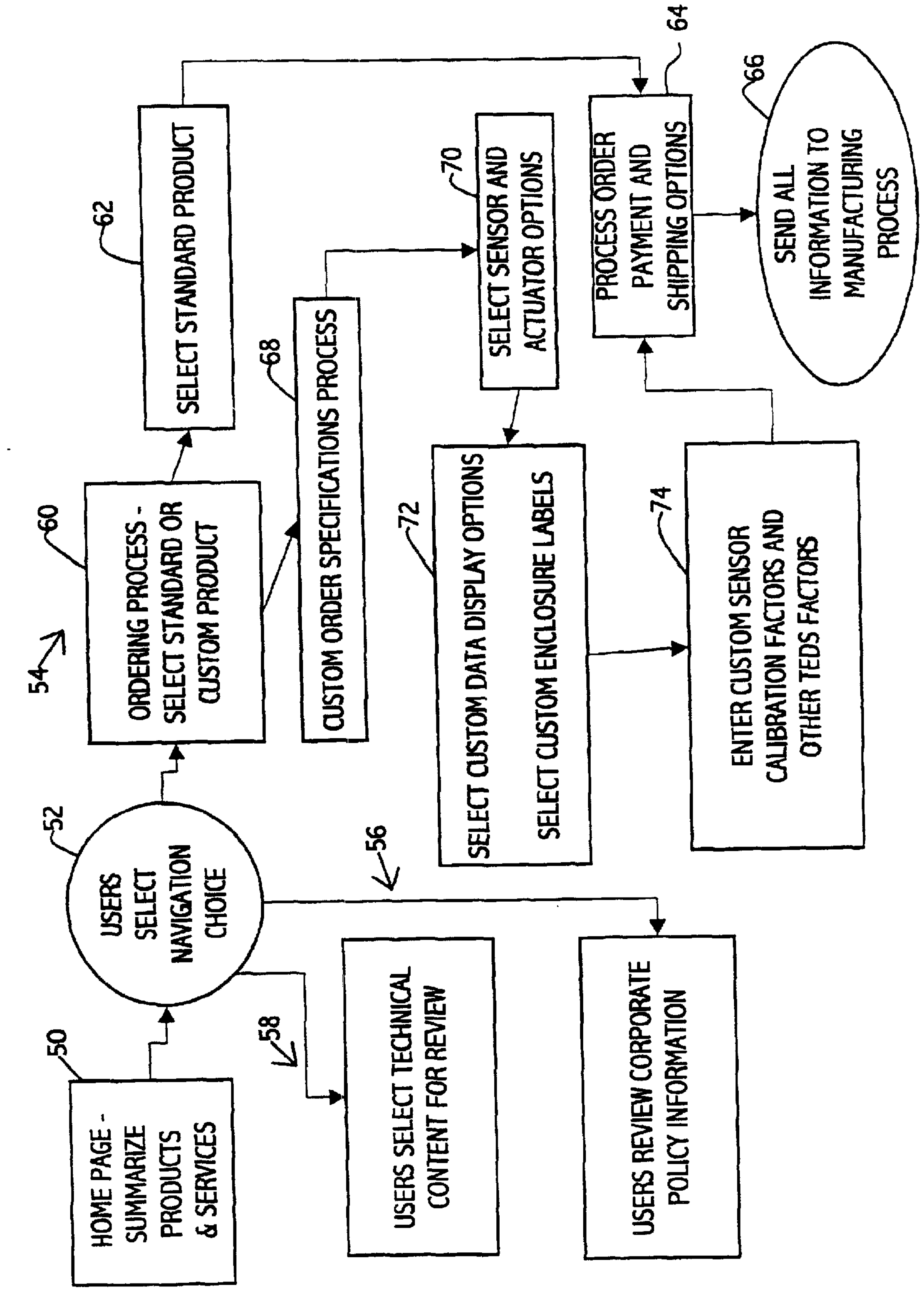
FIG. 3 is a flow diagram illustrating a website ordering process for the adaptable transducer interface of FIG. 1.

Referring to FIG. 3, a flow diagram illustrates a website ordering process for the ASTI unit according to the invention. In the illustrated embodiment of the invention, the ordering process is implemented by a customer accessing the manufacturer's website. The customer may do so using, for example, the personal computer 12 of FIG. 1 and connecting via the Internet to the manufacturing personal computer 20 acting as a web host.

The ordering process begins at a block 50 where the user logs on to the website homepage. The homepage may summarize the various products and services available. The user can then select a particular navigation choice represented by a node 52. The various navigation choices consists of an ordering process 54, corporate content 56 and technical content 58.

If the user selects the ordering process 54, then the website proceeds to a block 60 which begins the ordering process by asking the customer to select a standard or custom product. A standard product would be one of several standard configuration ASTI units designated by the manufacturer. If a standard product is selected, then the standard product selection is made at a block 62. This selection is made from a list of standard configuration ASTI products. Examples of such standard products may be an interface unit with two separate 4–20 mA inputs; an interface unit for two separate type J thermocouples; interface unit for two channels of 0–5 volt analog signals; interface unit for event timing and counting; and interface unit for vibration and temperature monitoring. As is apparent, various differently configured units may also be used. After the selection is made, then the order is processed at a block 64 including entering payment information and shipping information. A printed summary of the transaction would be returned to the user. The selected information is then sent to a manufacturing process at a node 66.

If the customer selects a custom product at the block 60, then a custom order specifications process is implemented beginning at a block 68. This process consists of viewing customized instructions. Sensor and actuator options are selected at a block 70. The selection would be made from a list of available sensor and available actuator types. Particularly, a combination of sensors and actuators can be made up to a limit of four sensors and two actuators. While this invention is described using four sensors and two actuators, this invention is not limited to these quantities. This technology can support a combined quantity of 255 sensors and actuators. The customer may also request special sensors or actuators not listed. Thereafter, at a block 72, the customer selects custom data display options and custom enclosure labels. The customer might be asked to enter customized screen name information to be displayed on user screen displays. Customized label information would also be entered to be printed on product labels. The sensor display type would identify operating characteristics of the transducer. Customized sensor display type and display scale information would be entered so that the customer can interactively arrange for displaying operating data of the transducer. Next, at a block 74, the customer enters the sensor calibration factors and other TEDS factors. From the block 74, the order is processed at the block 64, as discussed above.

Figure 4:
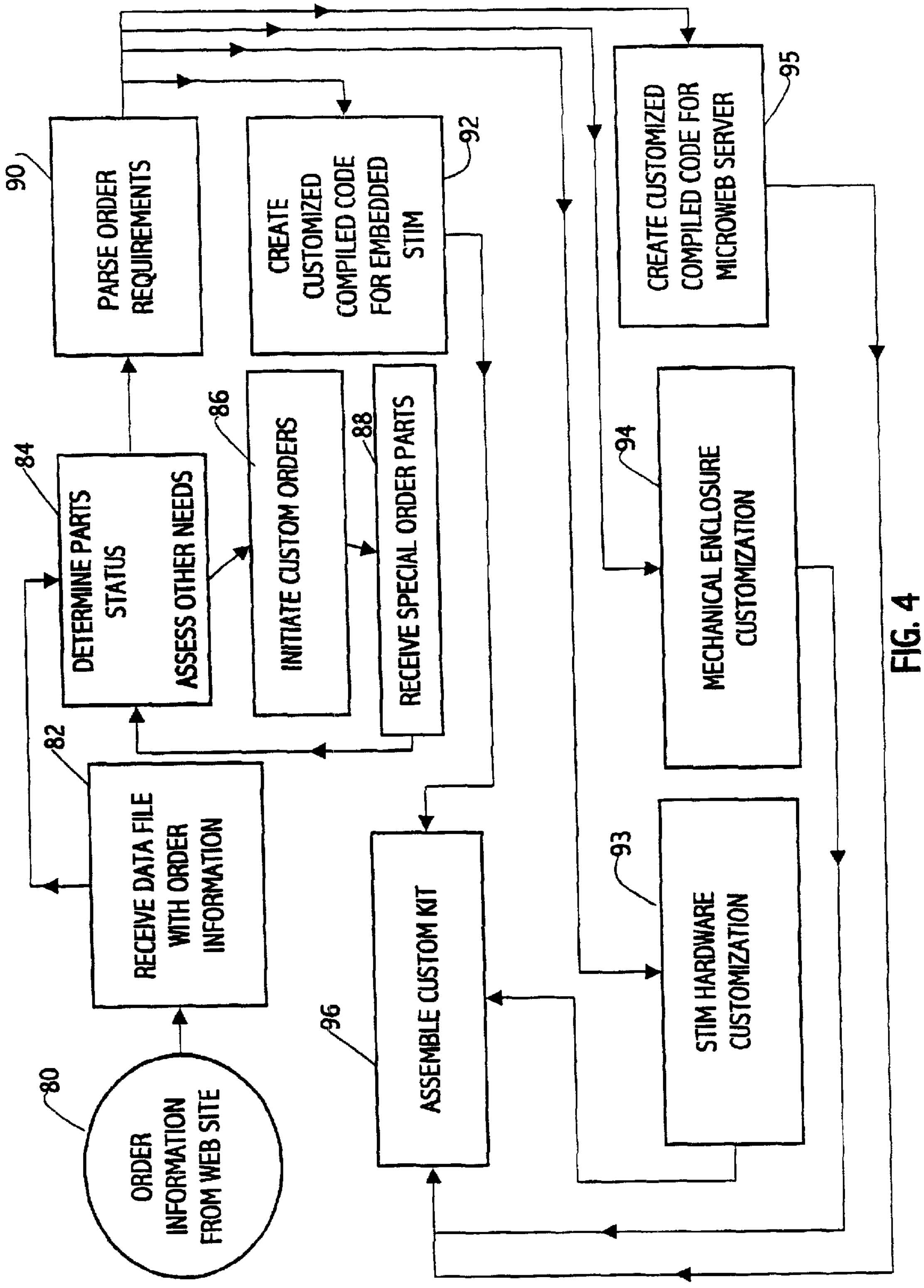
FIG. 4 is flow diagram illustrating a manufacturing process for the transducer interface of FIG. 1.

Referring to FIG. 4, a flow diagram illustrates the manufacturing process identified at the node 66 of FIG. 3. This process is used to manufacture the ASTI unit according to the customer's requirements. The process begins at a node 80 where order information from the website is received. This information may be available in the manufacturing system or may be provided from a separate website via Internet service provider, according to the particular arrangement. A data file with order information is received at a block 82. This file contains customized order information entered by the user. A block 84 determines status of required parts and assesses other needs for manufacturing the particular ASTI unit. This may consist of creating a unique order folder and validating the information entered by the user. Warehouse status of all required components is determined and any manual processing requirements are assessed. If custom parts are required for manufacturing, then custom orders are initiated at a block 86. This might also consist of custom software developments to satisfy the customer's needs. The process must then wait for parts or software to be received. Once the special order parts, or software are received, at a block 88, then the process returns back to the block 84.

Once all required components and software is available, then order requirements are parsed at a block 90. This consists of creating separate instruction sets for software modules to be embedded in the STIM 30, see FIG. 2, select customized software modules to be resident on the microweb server 38, see FIG. 2, define enclosure labels, specify electrical connectors, and specify any required electrical modifications and jumper settings on the customization circuits 34 of FIG. 2. The ordering process then follows four parallel paths. The first path is to create customized compiled code for the embedded STIM 30 at a block 92. This is done by combining predefined C modules selected for their functionality based on the customer's order. These modules are compiled into integrated sets of microprocessor machine instructions. The compiled instructions are downloaded to the STIM 30.

The next parallel process is STIM hardware customization implemented at a block 93. This consists of creating a list of instructions for production staff including all special integrated circuit replacement or insertions, all jumper insertions, and wiring hookups for enclosure connectors to become customization circuits 34.

The next parallel process is mechanical enclosure customization implemented at a block 94. This consists of printing label content for affixing to the ASTI unit based on user inputs at time of order entry. This might consist of customized screen title, data display style, in-chart titles, chart scale ranges. This would also consist of identifying location and type of electrical conductors to be installed during manufacturing.

The final parallel path is to create customized compiled code for the microweb server at the block 95. This consists of customizing HTML web pages based on the user's naming preferences. Select HTML modules and JAVA applets are integrated based on the customer's order requirements. The appropriate JAVA applets are included based on graphic display requests at order entry time. Limitations in total microweb server storage space limits, size of the code to be included so each unit must be customized and only the required code is included in the microweb server. This is loaded into the microweb server or NCAP 38.

Each of the parallel paths 92, 93, 94 and 95 reports its status upon completion of the process. Once all four parallel paths are completed, then a custom kit is assembled at a block 96. This integrates all instructions with special coding to provide the manufacturing staff with a unit kit for final assembly with partially customized STIM board, select electrical connectors, and special custom labels for the enclosure. The ASTI unit is then assembled and shipped to the customer.

Figure 5:
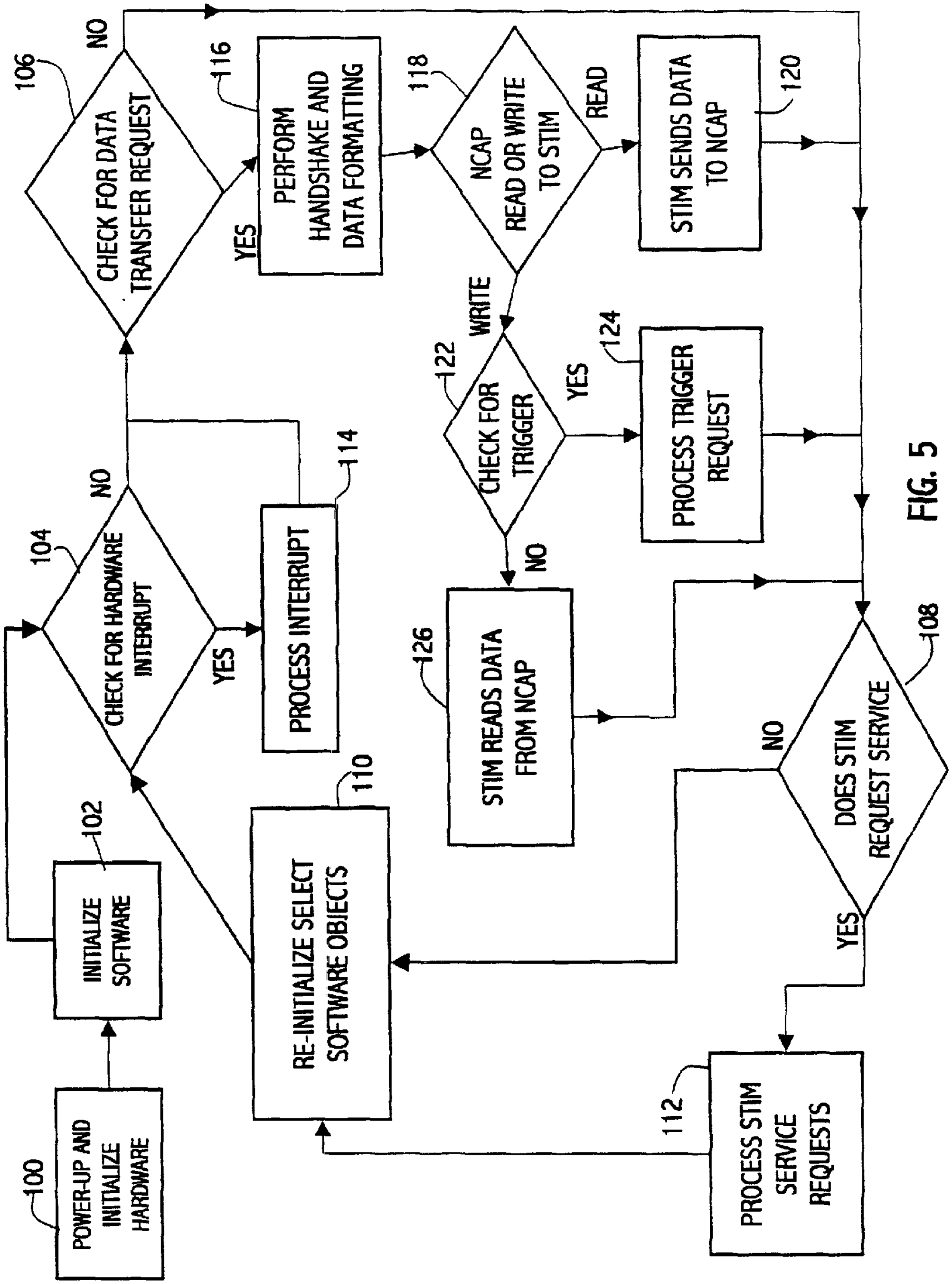
FIG. 5 is a flow diagram illustrating a transducer interface program implemented in the transducer interface module of FIG. 2.

Referring to FIG. 5, a flow diagram illustrates operation of the software resident in the STIM 30 of FIG. 2 during normal operation. Particularly, this flow diagram illustrates one of the main subsystems. As is apparent, other software routines may be implemented concurrently.

The flow diagram begins at a block 100 when the ASTI unit is powered up and the hardware is initialized. This sets up main board initialization routines and sets any sensor or actuator-specific control signals and reads configuration jumpers. A block 102 initializes software routines. This sets up the microcontroller, hardware I/O lines and software data structures. The main loop begins at a decision block 104 which checks for hardware interrupts. If there is no hardware interrupt, then a decision block 106 checks for data transfer requests. If there are no requests, then a decision block 108 determines if the STIM request service. Particularly, this block determines if the STIM or transducers connected to the STIM need servicing due to problem conditions. This may include checking on the attached sensors or actuators to check for out-of-range limits, send a trigger acknowledge, indicate out of consumables, such as low battery, indicate a self-test failure, indicate a calibration fail, or other transducer self validation message. If not, then select software objects are reinitialized at a block 110 and the program then returns to the decision block 104. If the STIM does request service, then the STIM's service requests are processed at a block 112. Once the service requests are processed, then the program proceeds to the block 110, discussed above.

If a hardware interrupt is received at the decision block 104, then the interrupt is processed at a block 114. The hardware interrupt is made from any one of several conditions generated by hardware elements in the ASTI unit. If there is no interrupt, then upon completion of the re-set the program proceeds to the decision block 106. Returning to the decision block 106, if there is an active data transfer request to send information to or receive information from the NCAP 38, then a block 116 performs handshake and data formatting. A decision block 118 determines if the request is for an NCAP read or for a write to the STIM. If it is to read, then at a block 120 the STIM 30 sends data to the NCAP 38. This consists of the STIM 30 interpreting the command from the NCAP 38 and writing information such as sensor measured value, or TEDS I. D. information, or the like. The program then proceeds to the decision block 108. If the request is to write information from the NCAP 38 to the STIM 30, then a decision block 122 checks for software trigger requests. If there are software trigger requests, then the trigger requests are processed at a block 124. The trigger requests may consist of changing the state of an actuator or reading sensor hardware. If there is no software trigger request, then at a block 126 the STIM reads data from the NCAP 38. This command might be, for example, to send actuator output voltage, or updated sensor calibration coefficients to the STIM 30. From either block 124 or 126, the program returns to the block 108.

Figure 6:
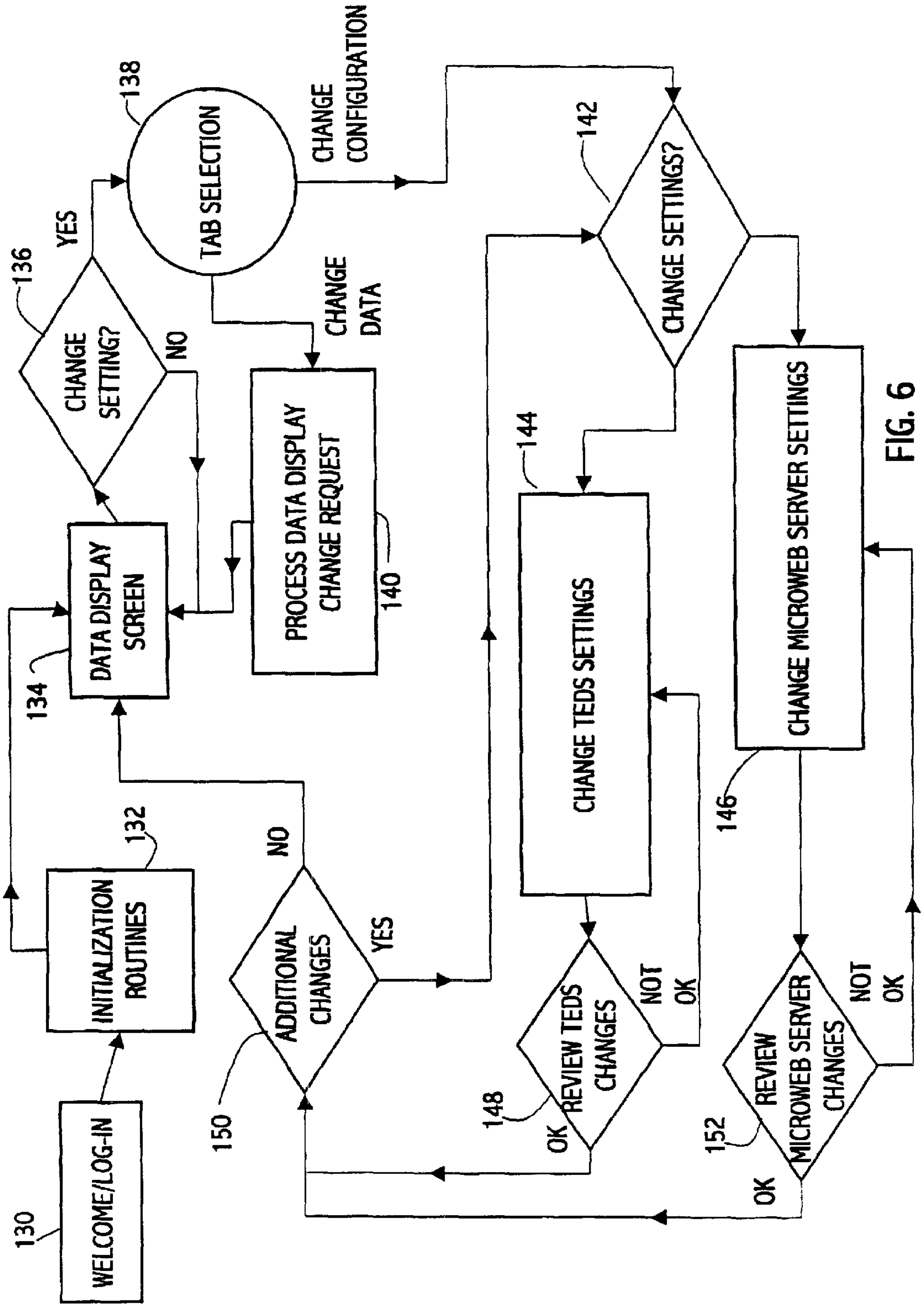
FIG. 6 is a flow diagram illustrating a network interface program implemented in the network capable application processor of FIG. 2.

Referring to FIG. 6, a flow diagram illustrates the operation of the HTML/JAVA client software stored on the NCAP 38 of FIG. 2 and executed on the user's personal computer 12 of FIG. 1. This program begins at a block 130 which implements a welcome at user log-in. Particularly, HTML welcome screens with log-in as appropriate for the user configuration are sent to the user over the network. A block 132 then implements any necessary initialization routines. This may consist of querying the STIM 30 to download data from the TEDS 32 for unit information plus downloading transducer specific data from the TEDS 32 for each implemented sensor channel and each actuator channel. A data display screen is generated at a block 134 as per the user configuration file. Default settings are used if the user has not updated configuration information. Again, this display screen is sent via the network for display via the user's browser software. A decision block 136 determines if it is necessary to change any settings. This is implemented by tab selection. If not, then the program returns to the block 134. Thus, the program stays in a loop consisting of the blocks 134 and 136 unless changes are selected or the user logs off, which is not shown.

If a tab selection is made to make changes, at the decision block 136, then the particular type of tab selection is determined at a node 138. One possible change is to change data display. This is implemented at a block 140 which is processed at a data display change request. Particularly, the user selects a transducer channel display, display format and display parameters. This may include, for example, graph style, sample frequency, graph axes parameters and graph axes labels. The program validates the user's selections for compatibility with the hardware and the data in the TEDS 32 and the software capabilities. The program then returns to the block 134 to display the data screen.

If the tab selection at the node 138 was to change configuration, then a decision block 142 determines whether the transducer settings to be changed were for TEDS information or for microweb server default settings. If the former, then the program proceeds to a block 144 to change the TEDS settings. If the latter, then the program proceeds to a block 146 to change microweb server settings.

If the selected change was to TEDS settings, at the block 144, then the user selects the transducer channel to change and then the particular parameter to change from a menu list of available TEDS fields indicating current values. This consists of details of the sensors' parameters. A decision block 148 reviews the TEDS changes to verify they are within range and the like. If not, then the program returns to the block 144. If so, then the program advances to a block 150 to determine if there are any additional changes. If there are no additional changes, then the program returns to the block 134. If there are additional changes, then the program returns to the decision block 142.

Returning to the block 146, if microweb server settings are to be changed, then if a password is required, then the password must be entered by the user. The user can then modify or print network settings, such as IP address, gateway address, level of security, etc. Once the changes are made, then they are reviewed at a decision block 152. If the changes are not acceptable, then the program returns to the block 146. If the changes are acceptable, then the program proceeds to the decision block 150, discussed above.

Figure 7:
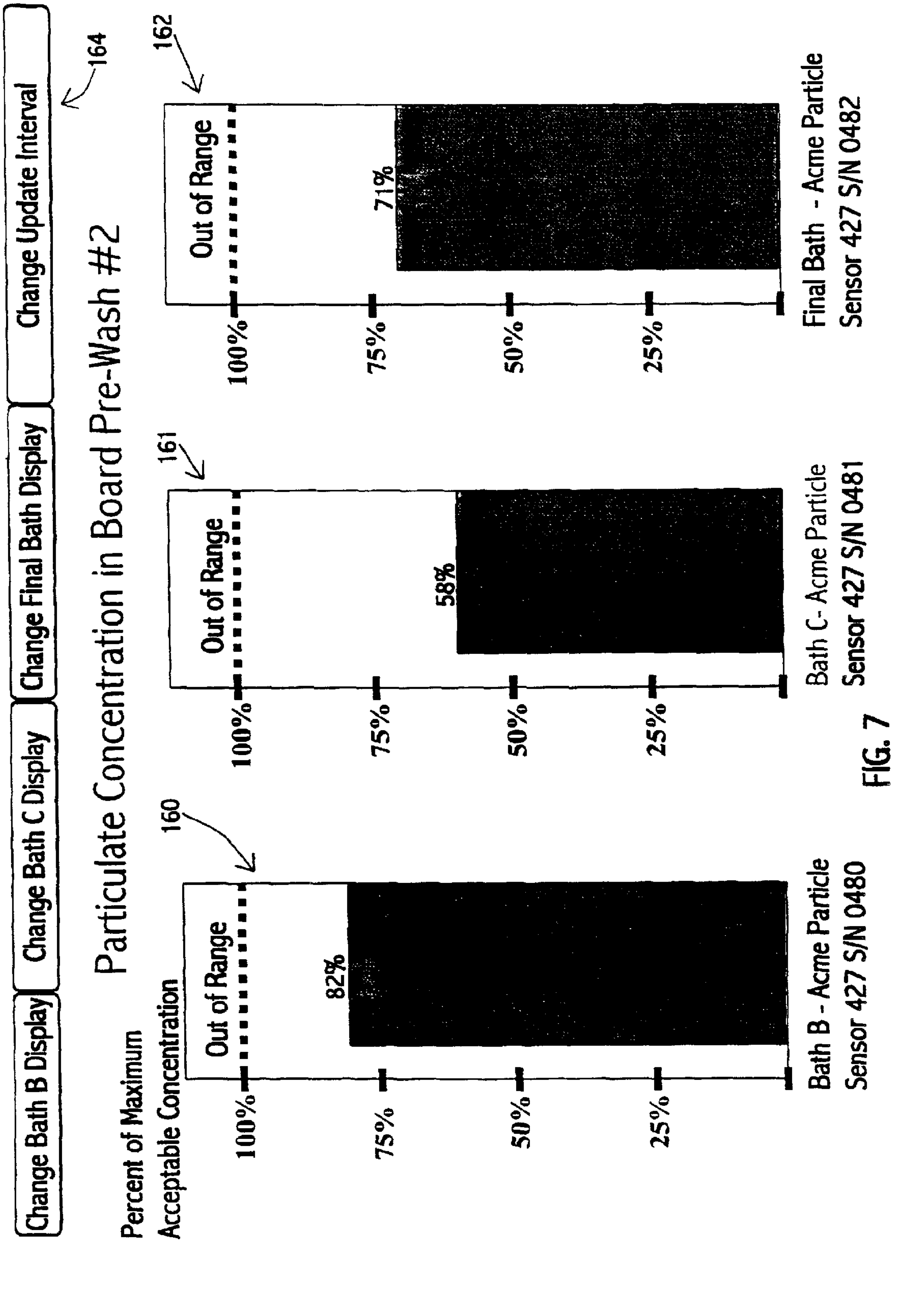
Figure 9:
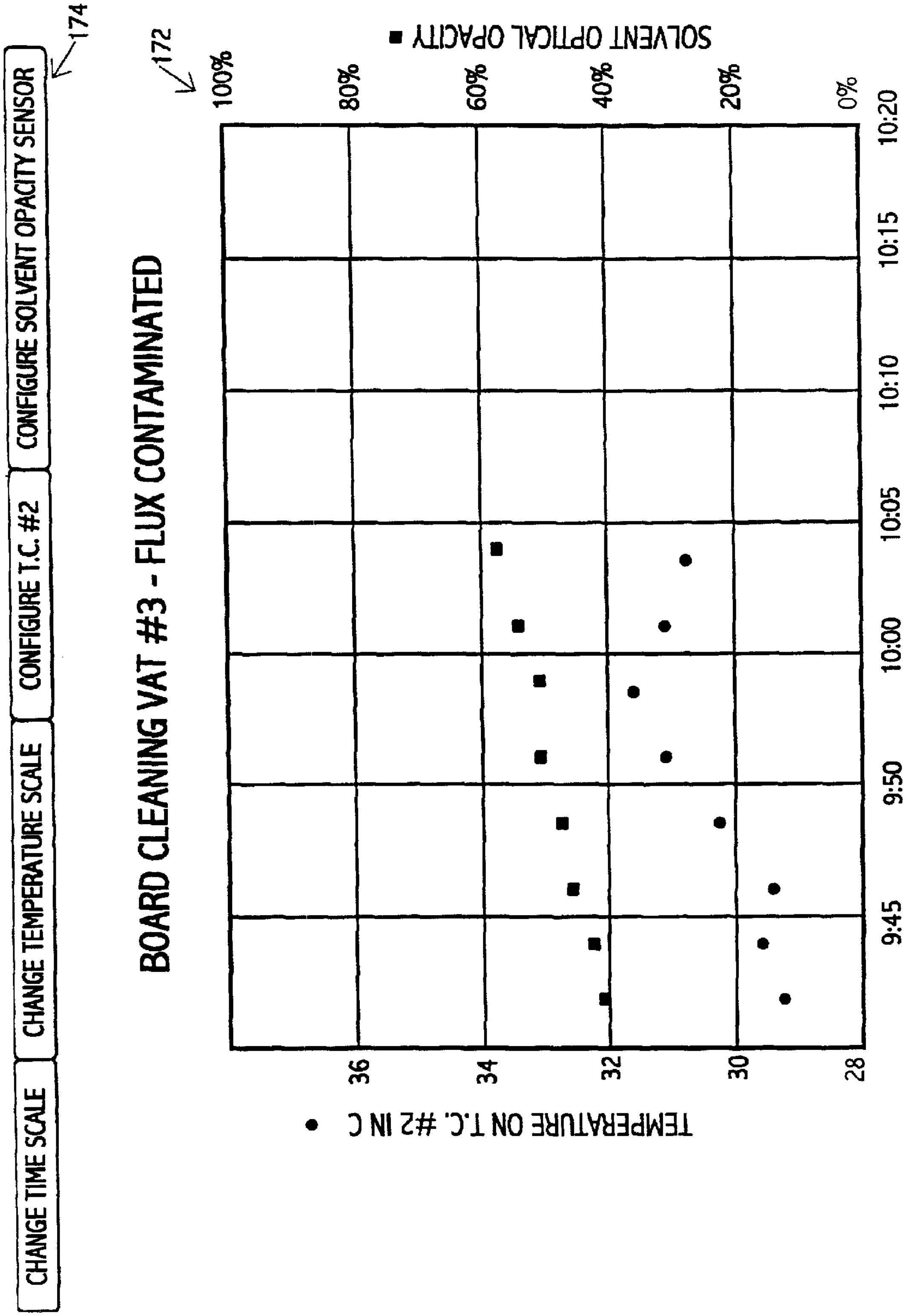

FIGS. 7–9 illustrate examples of display screens that might be created at the block 134 of FIG. 6. Particularly, FIG. 7 illustrates a screen display including three separate bar graphs 160, 161 and 162 for three separate sensors. A plurality of tabs 164 are provided at the top of the screen display for changing the individual displays or changing update intervals.

FIG. 8 illustrates a screen display showing a table 166 providing sensed temperature and humidity at various times. Tabs 168 are provided for changing the display settings and updating intervals. A screen-actuated button 170 is used to activate an exhaust fan via an appropriate actuator connected to an ASTI unit.

Finally, FIG. 9 illustrates a screen display for a graph from a temperature sensor and an opacity sensor 172. A plurality of tabs 174 are provided for changing time scale, temperature scale and configuring the sensors.

As is apparent from the above, the present invention relates to a method and apparatus for providing a customized, integrated solution to the problem of interfacing sensors and actuators to networks.

I claim:

1. The method of interfacing a transducer element to a communication network comprising:

providing an adaptable transducer interface comprising a programmable transducer interface controller for connecting to the transducer element and a programmable network interface controller for connecting to the communication network, the transducer interface controller being operatively connected to the network interface controller;

receiving user selectable transducer information identifying operating characteristics of the transducer element;

receiving user selectable operator interface information identifying display parameters interactively arranged for displaying operating data of the transducer element;

generating a transducer interface program for converting transducer element operating characteristics to user data and storing the transducer interface program in the transducer interface controller; and generating a network interface program based on the display parameters for creating screen displays using the user data and storing the network interface program in the network interface controller, the adaptable transducer interface being useable to remotely interface with the transducer element over the communication network.

2. The method of claim 1 wherein receiving user selectable transducer information identifying operating characteristics of the transducer element comprises receiving user entered information.

3. The method of claim 1 wherein receiving user selectable transducer information identifying operating characteristics of the transducer element comprises providing user selectable options for operating characteristics of the transducer element and the user selects from the user selectable options.

4. The method of claim 3 wherein the user selectable options comprise a selection of types of transducer sensors.

5. The method of claim 3 wherein the user selectable options comprise a selection of types of transducer actuators.

6. The method of claim 1 wherein receiving user selectable operator interface information identifying display parameters interactively arranged for displaying operating data of the transducer element comprises receiving user entered information.

7. The method of claim 1 wherein receiving user selectable operator interface information identifying display parameters interactively arranged for displaying operating data of the transducer element comprises providing user selectable options for display parameters and the user selects from the user selectable options.

8. The method of claim 1 wherein generating a transducer interface program comprises combining preconfigured software modules selected based on the received user selectable transducer operating characteristics.

9. The method of claim 8 wherein storing the transducer interface program in the transducer interface controller comprises downloading the preconfigured software modules to the transducer interface controller.

10. The method of claim 1 wherein generating a network interface program comprises customizing stored HTML web pages.

11. The method of claim 1 wherein generating a network interface program comprises creating Java Applets based on the display parameters.

12. The method of claim 1 further comprising creating a product label for the adaptable transducer interface using the user selectable transducer information and the user selectable operator interface information.

13. The method of claim 1 wherein providing an adaptable transducer interface comprising a programmable transducer interface controller for connecting to the transducer element comprises providing a microcontroller, a memory and a transducer interface circuit.

14. The method of claim 1 wherein providing an adaptable transducer interface comprising a programmable network interface controller for connecting to the communication network comprises providing an embedded microweb server.

15. The method of claim 1 wherein the transducer interface controller is operatively connected to the network interface controller using a transducer independent interface.

16. A user adaptable transducer interface for interfacing a transducer element having a signal interface connection to a communication network comprising:

a programmable transducer interface controller having terminations for connecting to the signal interface connection of the transducer element;

a programmable network interface controller for connecting to the communication network, the network interface controller being operatively connected to the transducer interface controller;

a user configured transducer interface program stored in the transducer interface controller for converting user selected transducer operating characteristics to user data; and a user configured network interface program stored in the network interface controller for creating screen displays based on user select display parameters using the user data;

the programmable network interface controller being connectable to the communication network to provide a remote interface with the transducer element over the communication network.

17. The transducer interface of claim 16 wherein the user configured network interface program identifies display parameters interactively arranged for displaying operating data of the transducer element.

18. The transducer interface of claim 16 wherein the transducer interface program comprises combined preconfigured software modules selected based on the received user selectable transducer operating characteristics.

19. The transducer interface of claim 16 wherein the network interface program comprises customized HTML web pages.

20. The transducer interface of claim 16 wherein the network interface program comprises Java Applets based on the display parameters.

21. The transducer interface of claim 16 wherein the programmable transducer interface controller comprises providing a microcontroller, a memory and a transducer interface circuit.

22. The transducer interface of claim 16 wherein the programmable network interface controller comprises an embedded microweb server.

* * * * *